US008029358B2

(12) United States Patent
Bigelow, Jr. et al.

(10) Patent No.: US 8,029,358 B2
(45) **Date of Patent: *Oct. 4, 2011**

(54) GAMING DEVICE HAVING FREE GAME BONUS WITH A CHANGING MULTIPLIER

(75) Inventors: Robert F. Bigelow, Jr., Reno, NV (US); James A. Vasquez, Carson City, NV (US); Paulina Glavich, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 681 days.

This patent is subject to a terminal disclaimer.

(21) Appl. No.: 11/840,048

(22) Filed: Aug. 16, 2007

(65) Prior Publication Data

US 2007/0281778 A1 Dec. 6, 2007

Related U.S. Application Data

(63) Continuation of application No. 10/086,146, filed on Feb. 28, 2002, now Pat. No. 7,258,611.

(51) Int. Cl.
*A63F 13/00* (2006.01)

(52) U.S. Cl. ................................ 463/25; 463/16; 463/20

(58) Field of Classification Search .......... 463/1, 16–22, 463/25, 39; 273/138.1
See application file for complete search history.

(56) References Cited

U.S. PATENT DOCUMENTS

| | | | |
|---|---|---|---|
| 2,545,644 | A | 3/1951 | Benton et al. |
| 4,198,052 | A | 4/1980 | Gauselmann |
| 4,258,838 | A | 3/1981 | Rockola et al. |
| 4,410,178 | A | 10/1983 | Partridge |
| 4,448,419 | A | 5/1984 | Telnaes |
| 4,513,970 | A | 4/1985 | Opresco et al. |
| 4,560,161 | A | 12/1985 | Hamano |
| 4,582,324 | A | 4/1986 | Koza et al. |
| 4,586,713 | A | 5/1986 | Abu-Shumays et al. |
| 4,618,150 | A | 10/1986 | Kimura |

(Continued)

FOREIGN PATENT DOCUMENTS

AU 199716432 B2 9/1997

(Continued)

OTHER PUBLICATIONS

3-Way Action Poker Brochure and Article written by written by IGT, published in 2002.

(Continued)

*Primary Examiner* — David L Lewis
*Assistant Examiner* — Robert Mosser
(74) *Attorney, Agent, or Firm* — K&L Gates LLP

(57) ABSTRACT

The present invention includes an apparatus and method for a bonus game, and particularly a free spin bonus with an incrementing multiplier. The bonus game includes a plurality of reels having a plurality of symbols and multipliers. The gaming device provides a number of free spins to the player at the beginning of the bonus game. The multiplier preferably starts at "1x" and increases by one after each free spin. Initially, the player spins the reels attempting to obtain a winning symbol combination on the reels. If the player obtains a winning combination, the gaming device provides an award. The award is multiplied by the multiplier and the player receives the multiplied award for that free spin. The player continues to spin the reels until there are no free spins remaining in the bonus game.

70 Claims, 8 Drawing Sheets

U.S. PATENT DOCUMENTS 4,624,459 A 11/1986 Kaufman
4,695,053 A 9/1987 Vazquez, Jr. et al.
4,706,956 A 11/1987 Abu-Shumays et al.
4,756,531 A 7/1988 DiRe et al.
4,805,907 A 2/1989 Haiwara
4,817,952 A 4/1989 Biro et al.
4,836,553 A 6/1989 Suttle et al.
4,838,552 A 6/1989 Hagiwara
4,844,467 A 7/1989 Gyenge et al.
4,861,041 A 8/1989 Jones et al.
4,871,171 A 10/1989 Rivero
4,874,173 A 10/1989 Kishishita
4,889,340 A 12/1989 Greene
4,991,848 A 2/1991 Greenwood et al.
5,019,973 A 5/1991 Wilcox et al.
5,033,744 A 7/1991 Bridgeman et al.
5,085,436 A 2/1992 Bennett
5,092,598 A 3/1992 Kamille
5,098,107 A 3/1992 Boylan et al.
5,102,134 A 4/1992 Smyth
5,102,137 A 4/1992 Ekiert
5,167,413 A 12/1992 Fulton
5,178,390 A 1/1993 Okada
5,205,555 A 4/1993 Hamano
5,209,479 A 5/1993 Nagao et al.
5,211,399 A 5/1993 Howard
5,249,800 A 10/1993 Hilgendorf et al.
5,259,616 A 11/1993 Bergmann
5,288,077 A 2/1994 Jones
5,288,081 A 2/1994 Breeding
5,332,219 A 7/1994 Marnell, II et al.
5,342,047 A 8/1994 Heidel et al.
5,342,049 A 8/1994 Wichinsky et al.
5,356,160 A 10/1994 Urlwin
5,362,052 A 11/1994 Kubatsch
5,364,100 A 11/1994 Ludlow et al.
5,364,105 A 11/1994 Jones
5,377,973 A 1/1995 Jones et al.
5,393,057 A 2/1995 Marnell, II
5,393,061 A 2/1995 Manship et al.
5,395,111 A 3/1995 Inoue
5,407,200 A 4/1995 Zalabak
5,423,539 A 6/1995 Nagao
5,429,507 A 7/1995 Kaplan
5,431,407 A 7/1995 Hofberg et al.
5,437,462 A 8/1995 Breeding
5,449,173 A 9/1995 Thomas et al.
5,452,899 A 9/1995 Skratulia et al.
5,456,465 A 10/1995 Durham
5,490,670 A 2/1996 Hobert
5,494,287 A 2/1996 Manz
5,511,781 A 4/1996 Wood et al.
5,524,888 A 6/1996 Heidel
5,529,309 A 6/1996 Bartlett
5,531,440 A 7/1996 Dabrowski et al.
5,531,441 A 7/1996 Dabrowski et al.
5,536,016 A 7/1996 Thompson
5,542,669 A 8/1996 Charron et al.
5,560,603 A 10/1996 Seelig et al.
5,569,084 A 10/1996 Nicastro et al.
5,577,731 A 11/1996 Jones
5,584,485 A 12/1996 Jones et al.
5,607,162 A 3/1997 Boylan et al.
5,611,535 A 3/1997 Tiberio
5,626,341 A 5/1997 Jones et al.
5,642,882 A 7/1997 Guerzini
5,642,884 A 7/1997 Pitcher
5,647,798 A 7/1997 Falciglia
5,655,965 A 8/1997 Takemoto et al.
5,660,391 A 8/1997 Klasee
5,660,393 A 8/1997 Dreger
5,664,781 A 9/1997 Feola
5,711,525 A 1/1998 Breeding
D392,340 S 3/1998 DeSimone
5,722,891 A 3/1998 Inoue
5,732,948 A 3/1998 Yoseloff
5,743,524 A 4/1998 Nannicola
5,752,881 A 5/1998 Inoue
5,766,074 A 6/1998 Cannon et al.
5,769,716 A 6/1998 Saffari et al.
5,772,506 A 6/1998 Marks et al.
5,772,509 A 6/1998 Weiss
5,775,692 A 7/1998 Watts et al.
5,788,573 A 8/1998 Baerlocher et al.
5,794,964 A 8/1998 Jones et al.
5,795,225 A 8/1998 Jones et al.
5,807,172 A 9/1998 Piechowiak
5,823,873 A 10/1998 Moody
5,823,874 A 10/1998 Adams
5,833,536 A 11/1998 Davids et al.
5,833,537 A 11/1998 Barrie
5,836,041 A 11/1998 Kleinpell, II et al.
5,848,932 A 12/1998 Adams
5,851,148 A 12/1998 Brune et al.
5,855,514 A 1/1999 Kamille
5,863,041 A 1/1999 Boylan et al.
5,873,781 A 2/1999 Keane
5,882,261 A 3/1999 Adams
5,885,157 A 3/1999 Harada et al.
5,890,962 A 4/1999 Takemoto
5,911,418 A 6/1999 Adams
5,918,880 A 7/1999 Voigt, IV et al.
5,919,088 A 7/1999 Weiss
5,927,714 A 7/1999 Kaplan
5,934,672 A 8/1999 Sines et al.
5,935,002 A 8/1999 Falciglia
5,947,820 A 9/1999 Morro et al.
5,951,397 A 9/1999 Dickinson
5,964,463 A 10/1999 Moore, Jr.
5,967,894 A 10/1999 Kinoshita et al.
5,971,849 A 10/1999 Falciglia
5,980,384 A 11/1999 Barrie
5,984,781 A 11/1999 Sunaga
5,988,638 A 11/1999 Rodesch et al.
5,996,997 A 12/1999 Kamille
5,997,400 A 12/1999 Seelig et al.
5,997,401 A 12/1999 Crawford
6,003,867 A 12/1999 Rodesch et al.
6,004,207 A 12/1999 Wilson, Jr. et al.
6,012,982 A 1/2000 Piechowiak et al.
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mangano et al.
6,062,978 A 5/2000 Martino et al.
6,062,980 A 5/2000 Luciano
6,086,066 A 7/2000 Takeuchi et al.
6,089,976 A 7/2000 Schneider et al.
6,089,978 A 7/2000 Adams
6,093,102 A 7/2000 Bennett
6,095,921 A 8/2000 Walker et al.
6,102,031 A 8/2000 Waters
6,102,400 A 8/2000 Scott et al.
6,102,798 A 8/2000 Bennett
6,117,009 A 9/2000 Yaseloff
6,120,377 A 9/2000 McGinnis, Sr. et al.
6,120,378 A 9/2000 Moody et al.
6,126,541 A 10/2000 Fuchs
6,126,542 A 10/2000 Fier
6,135,885 A 10/2000 Lermusiaux
6,142,873 A 11/2000 Weiss et al.
6,142,874 A 11/2000 Kodachi et al.
6,142,875 A 11/2000 Kodachi et al.
6,146,273 A 11/2000 Olsen
6,149,156 A 11/2000 Feola
6,149,521 A 11/2000 Sanduski
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.

| | | | |
|---|---|---|---|
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,409 | B1 | 3/2001 | Kennedy et al. |
| 6,203,428 | B1 | 3/2001 | Giobbi et al. |
| 6,203,429 | B1 | 3/2001 | Demar et al. |
| 6,210,279 | B1 | 4/2001 | Dickinson |
| 6,213,875 | B1 | 4/2001 | Suzuki |
| 6,213,876 | B1 | 4/2001 | Moore, Jr. |
| 6,217,448 | B1 * | 4/2001 | Olsen .............................. 463/25 |
| 6,220,959 | B1 | 4/2001 | Holmes, Jr. et al. |
| 6,224,483 | B1 | 5/2001 | Mayeroff |
| 6,224,484 | B1 | 5/2001 | Okuda et al. |
| 6,227,970 | B1 | 5/2001 | Shimizu et al. |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,607 | B1 | 6/2001 | Payne et al. |
| 6,251,013 | B1 | 6/2001 | Bennett |
| D445,841 | S | 7/2001 | Sabo |
| 6,261,177 | B1 | 7/2001 | Bennett |
| 6,270,408 | B1 | 8/2001 | Sakamoto et al. |
| 6,270,409 | B1 | 8/2001 | Shuster |
| 6,270,411 | B1 | 8/2001 | Gura et al. |
| 6,270,412 | B1 | 8/2001 | Crawford et al. |
| 6,287,194 | B1 | 9/2001 | Okada et al. |
| 6,290,600 | B1 | 9/2001 | Glasson |
| 6,296,568 | B1 | 10/2001 | Tracy |
| 6,299,165 | B1 | 10/2001 | Nagano |
| 6,302,790 | B1 | 10/2001 | Brossard |
| 6,305,686 | B1 | 10/2001 | Perrie et al. |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,860 | B1 | 1/2002 | Webb |
| 6,336,863 | B1 | 1/2002 | Baerlocher et al. |
| 6,340,158 | B2 | 1/2002 | Pierce et al. |
| 6,346,043 | B1 | 2/2002 | Colin et al. |
| 6,347,996 | B1 | 2/2002 | Gilmore et al. |
| 6,358,147 | B1 | 3/2002 | Jaffe et al. |
| 6,364,766 | B1 | 4/2002 | Anderson et al. |
| 6,364,768 | B1 | 4/2002 | Acres et al. |
| 6,368,216 | B1 | 4/2002 | Hedrick et al. |
| 6,375,187 | B1 | 4/2002 | Baerlocher |
| 6,394,902 | B1 | 5/2002 | Glavich et al. |
| D458,311 | S | 6/2002 | Seelig et al. |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,425,824 | B1 | 7/2002 | Baerlocher et al. |
| 6,435,511 | B1 | 8/2002 | Vancura et al. |
| 6,439,995 | B1 | 8/2002 | Hughs-Baird et al. |
| D463,504 | S | 9/2002 | Stephan |
| 6,443,452 | B1 | 9/2002 | Brune |
| 6,443,837 | B1 | 9/2002 | Jaffe et al. |
| 6,454,266 | B1 | 9/2002 | Breeding et al. |
| 6,454,651 | B1 | 9/2002 | Yoseloff |
| 6,461,241 | B1 | 10/2002 | Webb et al. |
| 6,464,582 | B1 | 10/2002 | Baerlocher et al. |
| 6,468,156 | B1 | 10/2002 | Hughs-Baird et al. |
| 6,471,208 | B2 | 10/2002 | Yoseloff et al. |
| 6,481,713 | B2 | 11/2002 | Perrie et al. |

| | | | |
|---|---|---|---|
| 6,491,584 | B2 | 12/2002 | Graham et al. |
| 6,494,785 | B1 | 12/2002 | Gerrard et al. |
| 6,506,114 | B1 | 1/2003 | Estes et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,533,658 | B1 | 3/2003 | Walker et al. |
| 6,537,150 | B1 | 3/2003 | Luciano et al. |
| 6,537,152 | B2 | 3/2003 | Seelig et al. |
| 6,551,187 | B1 | 4/2003 | Jaffe |
| 6,554,703 | B1 | 4/2003 | Bussick et al. |
| 6,558,253 | B1 | 5/2003 | DeSimone et al. |
| 6,558,254 | B2 | 5/2003 | Baelocher et al. |
| 6,561,904 | B2 | 5/2003 | Locke et al. |
| 6,565,436 | B1 | 5/2003 | Baerlocher |
| 6,569,015 | B1 | 5/2003 | Baerlocher et al. |
| 6,569,016 | B1 | 5/2003 | Baerlocher |
| 6,572,471 | B1 | 6/2003 | Bennett |
| 6,572,473 | B1 | 6/2003 | Baerlocher |
| 6,575,830 | B2 | 6/2003 | Baerlocher et al. |
| 6,585,591 | B1 | 7/2003 | Baerlocher et al. |
| 6,589,114 | B2 | 7/2003 | Rose |
| 6,592,457 | B1 | 7/2003 | Frohm et al. |
| 6,595,854 | B2 | 7/2003 | Hughs-Baird et al. |
| 6,599,185 | B1 | 7/2003 | Kaminkow et al. |
| 6,599,192 | B1 | 7/2003 | Baerlocher et al. |
| 6,602,137 | B2 | 8/2003 | Kaminkow et al. |
| 6,604,740 | B1 | 8/2003 | Singer et al. |
| 6,605,002 | B2 | 8/2003 | Baerlocher |
| 6,607,437 | B2 | 8/2003 | Casey et al. |
| 6,607,438 | B2 | 8/2003 | Baerlocher et al. |
| 6,609,974 | B2 | 8/2003 | Mead et al. |
| 6,632,139 | B1 | 10/2003 | Baerlocher |
| 6,632,141 | B2 | 10/2003 | Webb et al. |
| 6,634,941 | B2 | 10/2003 | Olive |
| 6,634,943 | B1 | 10/2003 | Baerlocher |
| 6,638,164 | B2 | 10/2003 | Randall et al. |
| 6,644,664 | B2 | 11/2003 | Muir et al. |
| 6,676,512 | B2 | 1/2004 | Fong et al. |
| 6,688,977 | B1 | 2/2004 | Baerlocher et al. |
| 6,719,630 | B1 | 4/2004 | Seelig et al. |
| 6,733,389 | B2 | 5/2004 | Webb et al. |
| 6,746,329 | B1 | 6/2004 | Duhamel |
| 6,805,349 | B2 | 10/2004 | Baerlocher et al. |
| 6,869,360 | B2 | 3/2005 | Marks et al. |
| 6,913,532 | B2 | 7/2005 | Baerlocher et al. |
| 6,921,335 | B2 | 7/2005 | Rodgers et al. |
| 6,932,700 | B2 | 8/2005 | Bennett et al. |
| 6,955,600 | B2 | 10/2005 | Glavich et al. |
| 6,971,954 | B2 | 12/2005 | Randall et al. |
| 7,070,501 | B2 | 7/2006 | Cormack |
| 7,147,559 | B2 | 12/2006 | Englman |
| 7,238,110 | B2 | 7/2007 | Glavich et al. |
| 2001/0009865 | A1 | 7/2001 | Demar et al. |
| 2001/0048193 | A1 | 12/2001 | Yoseloff et al. |
| 2002/0010017 | A1 | 1/2002 | Bennett |
| 2002/0019255 | A1 | 2/2002 | Randall |
| 2002/0025844 | A1 | 2/2002 | Casey et al. |
| 2002/0045475 | A1 | 4/2002 | Glavich et al. |
| 2002/0072402 | A1 | 6/2002 | Baerlocher |
| 2002/0094857 | A1 | 7/2002 | Meyer |
| 2002/0142822 | A1 | 10/2002 | Baerlocher et al. |
| 2002/0151350 | A1 | 10/2002 | Baerlocher et al. |
| 2002/0155883 | A1 | 10/2002 | Baerlocher |
| 2003/0013514 | A1 | 1/2003 | Cregan et al. |
| 2003/0040355 | A1 | 2/2003 | Baerlocher |
| 2003/0045344 | A1 | 3/2003 | Webb et al. |
| 2003/0045348 | A1 | 3/2003 | Palmer et al. |
| 2003/0054875 | A1 | 3/2003 | Marks et al. |
| 2003/0060272 | A1 | 3/2003 | Glavich et al. |
| 2003/0064795 | A1 | 4/2003 | Baerlocher et al. |
| 2003/0069053 | A1 | 4/2003 | Dovgan |
| 2003/0073483 | A1 | 4/2003 | Glavich et al. |
| 2003/0162585 | A1 | 8/2003 | Bigelow, Jr. et al. |
| 2004/0009803 | A1 | 1/2004 | Bennett et al. |
| 2004/0038731 | A1 | 2/2004 | Englman |
| 2005/0049035 | A1 | 3/2005 | Baerlocher et al. |
| 2005/0104298 | A1 | 5/2005 | Butcher et al. |
| 2005/0266917 | A1 | 12/2005 | Glavich et al. |

FOREIGN PATENT DOCUMENTS

| | | | |
|---|---|---|---|
| AU | A-50327/96 | | 10/1997 |
| AU | A-63553/98 | | 10/1998 |
| AU | 200177369 | | 4/2002 |
| AU | 778685 | | 4/2005 |
| DE | 4014477 | A1 | 7/1991 |
| EP | 0410789 | A2 | 7/1990 |
| EP | 0410789 | A3 | 7/1990 |
| EP | 0 688 645 | A2 | 12/1995 |
| EP | 0688002 | A1 | 12/1995 |
| EP | 0 798 676 | A1 | 10/1997 |
| EP | 0874337 | A1 | 10/1998 |
| EP | 0926645 | A2 | 6/1999 |
| EP | 0 945 837 | A2 | 9/1999 |
| EP | 0944030 | A2 | 9/1999 |
| EP | 0 981 119 | A2 | 2/2000 |
| EP | 0984409 | A2 | 8/2000 |
| EP | 1063622 | | 12/2000 |
| GB | 2 072 395 | A | 9/1981 |
| GB | 2 083 936 | A | 3/1982 |
| GB | 2 092 797 | | 8/1982 |
| GB | 2 144 644 | A | 3/1985 |
| GB | 2 201 821 | A | 9/1988 |
| GB | 2 202 984 | A | 10/1988 |
| GB | 2 253 300 | A | 2/1992 |
| GB | 2 332 217 | A | 8/1998 |
| GB | 2 328 311 | A | 2/1999 |
| WO | WO 93/03464 | | 2/1993 |
| WO | WO 9732285 | | 9/1997 |
| WO | WO 98 23963 | | 6/1998 |
| WO | WO 0012186 | | 3/2000 |
| WO | WO 00/32286 | | 6/2000 |
| WO | WO 01/26019 | A1 | 4/2001 |
| WO | 0193966 | | 12/2001 |

OTHER PUBLICATIONS

Addams Family Advertisement and Article written by IGT, Strictly Slots, published in 2000.
American Thunder Screen Shots written by IGT, published in 1998.
Bally Slot Machines Electro-Mechanicals 1964-1980 Book, Revised 3rd Edition [in Part] written by Marshall Fey.
Bonus Times written by Bally Gaming, published in 2000.
Cash Crop Brochure written by Arist O Crat Leisure Industries, published in 1997.
Catch a Wave Advertisement written by IGT, published in Dec. 2000.
Cuckoo Aristocrat Brochure written by Aristocrat, published in Feb. 1998.
Dolphin Treasure Advertisement written by Aristocrat Leisure Industries Pty., Ltd., published in 1996.
DoubleBucks Brochure written by IGT (not dated).
Field Testing New Slots Article, written by Strictly Slots, published in Jul. 2000.
Leopard Spots™ (website) written by www.igt.com, printed Mar. 21, 2001.
Mega Multiplier® (website) written by www.wmsgaming.com, printed May 22, 2001.
Money Grab (website) written by www.wmsgaming.com, printed May 22, 2001.
Money Mouse Brochure written by Arist O Crat Leisure Industries, published in 1997.
Polly & Roger Brochure written by VLC, Inc, published in 2000.
Spin Til You Win Game Description written by IGT, published in 1996.
Take Your Pick Article written by Strictly Slots, published in Mar. 2001.
Top Cat Brochure written by WMS Gaming, Inc., published prior to 2001.
Treasure Tunnel, Treasure Wheel Brochure written by Sigma Game, Inc., published prior to 2001.
Vision Series™/Good Times™ written by IGT, published in 1999.
X Factor Brochure and Website Page written by WMS Gaming, Inc., published in 1998.
Yahtzee Video Game Advertisement, written by Mikohn Winning Solutions Worldwide, published 1999.
1DU Dice Unit Advertisement [online] [retrieved from the Internet May 14, 2001] <URL:http://starpoint.uk.com/1du.html>.
Big Bang Piggy Bankin Advertisement written by WMS Gaming, Inc., published prior to 2000, on or before Dec. thereof.
Bunco Night Advertisement, International Game Technology, 2002, on or before December there of.
By George Advertisement, International Game Technology, 2002, on or before December thereof.
Cash box Advertisement & Article written by anchor Games, Strictly Slots, published in 2000, on or before Dec. thereof.
Chutes & Ladders Game Instructions written by Hasbro-Milton Bradley, published in 1999, on or before December thereof.
Dice Games Article describing Poker dice, published prior to 2001, on or before December thereof.
Enchanted Unicorn Advertisement written by IGT, published in 2001.
Faster Harder More Challenging Q'bert game description [online] [retrieved from the Internet Mar. 12, 2002] written by The Killer List of Videogames, <URL:http://www.klov.com/F/Faster__Harder__More__Challenging__Qbert.html>.
Fire and Fortune Article in Strictly Slots, Anchor Games, May 2001.
Fox "N" Hound Advertisement written by IGT, published in 2002, on or before Decemeber thereof.
Free! 7-Day Trial on Daval's Reel dice Advertisement written by Gerber & Glass published in 1936, on or before December thereof.
Fundamentals of Craps Book [in Part], written by mason Malmuth and Lynne Loomis, published in 1995, on or before December thereof.
Good times Brochure written by IGT, published in 1999, on or before Decemeber thereof.
Ghoulish Gamble Advertisement, written by Konami Australia Pty Ltd,. published prior to Sep. 2000.
Gotlieb Emulator Project written by Lee Taylor, [online] [retrieve from the Internet Mar. 12, 2002] <URL: http://www.defender.demon.co.uk/qbert.html>.
Love Lucy Advertisement written by IGT, published in 2002, on or before Decemeber thereof.
In Between Game Description written by IGT, available prior to 2000, on or before Decemeber thereof.
Jackpot Party Brochures and Articles, written by WMS Gaming, Inc., published in 1998, on or before December thereof.
Levy Patent Abstract, written by Derwent publications Ltd., published in 1991, on or before Decemeber thereof.
Loaded Dice Strictly Slots Article, Konami, Dec. 2000.
Mikohn Solutions Article in the World Gaming Congress 2000 Edition, on or before December thereof.
Money Grab Article written by Strictly Slots, published in Apr. 2001.
Monopoly Brochures and Articles written by WMS Gaming, Inc. published in 1998, on or before December thereof.
Monopoly Party Train Article written by Strictly Slots, published Feb. 2002.
Neon Nights written by IGT, published in 2000, on or before December thereof.
New Kids Article written by Strictly Slots published in Dec. 2000.
On the Money Article written by Strictly Slots, Casino Data Systems, published in Dec. 2000.
Penguin Pays written in Commentary in Strictly Slots/Aristocrat in Apr. 1999.
Pick'em Poker Plus Advertisement written by Ball Gaming Systems in 2002.
Price is Right "Cliff Hangers" description [online] [printed on Mar. 21, 2001]. Retrieved from the Internet at <URL:http://www.geocities.com;members.aol.com>.
Price is Right "Showcases" Description [online] [retrieved from the Internet Mar. 16, 2001] <URL:schuminweb.com>.
Q'bert Board Game Instructions written by Parker Brothers, published in 1983, in or before December thereof.
Q'bert video game cartridge instructions for ATARI 2600 game system written by Parker Brothers [online] [retrieved from the Internet Feb. 12, 2002] <URL:http://www.hasbro.com/default.asp?x=cc__gameandtoyinstructions>.
Q'bert video game cartridge instructions for ATARI home computer written by Parker Brothers and Arcade/Action Software, [online]

[retrieved from the Internet Mar. 12, 2002] <URL://http://http://www.hasbro.com/default.asp?x=cc__gameandtoyinstructions>.
Q'bert video game cartridge instructions for Colecovision game system written by Parker Brothers, [online] [retrieved from the Internet Mar. 13, 2002] <URL:http://www.xhasbro.com/default.asp?x=cc__gameandtoyinstructions>.
Q'bert video game cartridge instructions for Commodore 64 game system written by Parker Brothers and Arcade/Action Software, [online] [retrieved from the Internet Mar. 12, 2002] <URL:http://www.hasbro.com/default.asp?x=cc__gameandtoyinstructions>.
Q'bert video game cartridge instructions for Intellivision game system written by Parker Brothers, [online] [retrieved from the Internet Mar. 12, 2002] <URL:http://www.hasbro.com/default.asp?x=cc__gameandtoyinstructions>.
Q'bert video game cartridge instructions for Texas Instrument 99/4A game system written by Parker Brothers and Arcade/Action Software, [online] [retrieved from the Internet Mar. 12, 2002] <URL:http://www.hasbro.com/default.asp?x=cc__gameandtoyinstructions>.
Q'bert Game Description written by The Killer List of Videogames [online] [printed by Mar. 12, 2002]. Retrieved from the Internet at <URL:http://www.klov.com/Q/Qbert.html>.
Q'bert Qubes Game Description written by The Killer List of Videogames [online] [printed on Mar. 12, 2002]. Retrieved from the Internet at <URL:http://www.klov.com/Q/Qbert's_Qubes.html>.
Q'bert Video Game Advertisement for PlayStation, [online] [printed on Mar. 12, 2002] Retrieved from the Internet at <URL:http://www.amazon.com>.
Q'bert Video Game Advertisement written by Pennsylvania Gameroom Warehouse [online] [printed on Mar. 12, 2002]. Retrieved from the Internet at <URL:http://www.gameroomwarehouse.com/videogame/qbert.html>.
Q'bert: Classic Video Game surrealism from the Golden Age of Arcade Games written by e-glide, [online] [printed on Mar. 12, 2002]. Retrieved from the Internet at <URL:http://www.users.rcn.com/e-glide/qbert2.html>.
How to Play Q'bert, written by Gottlieb Amusement Games [online] [printed on Mar. 12, 2002]. Retrieved from the Internet at <URL:http://www.coinop.org/features/qbstory.html>.
The Creation of Q'bert written by Warren Davis, [online] [printed on Mar. 12, 2002]. Retrieved from the Internet at <URL:http://www.coinop.org/features/qbstory.html>.
The History of Q'bert written by Jeff Lee, [online] [printed on Mar. 12, 2002]. Retrieved from the Internet at <URL:http://www.users.aol.com/JPMLee/qbert.html>.
Richard Petty Advertisement written by IGT, published in 2000, on or before December thereof.
Roll and Win Advertisement, written by WMS Gaming, [online] [printed on Jun. 8, 2001]. Retrieved from the Internet at <URL:http://www.wmsgaming.com>.
Slot Machines Buyer's Handbook, A Consumer's Guide to Slot Machines written by David L. Saul and Daniel R. mead, published on 1998 in or before Decemeber thereof.
Slot Machines A Pictorial History of the First 100 Years, 5th Edition [In Part] written by Marshall Fey, published 1983 to 1997, on or before December thereof.
Slot Machines Article by Marshall Fey, published 1983, 1989, 1991, 1994 and 1997 on or before December thereof.
Slot Machines on Parade [in Part], written by Robert N. Geddes and illustrated by Daniel R. Mead, published on 1980, in or before December thereof.
Spam Article written by IGT, published in 2002, on or before Decemeber thereof.
Spell Binder Advertisement written by IGT, published in 2000, on or before December thereof.
Stars, Bars and Bones Game Description written by P & M Coins, Inc., available 1997, on or before December thereof.
Super Cherry Advertisement written by IGT, published in 2001, on or before December thereof.
Take Your Pick Advertisement written by IGT/Anchor Gaming, published in 1999, on or before December thereof.
Texas Tea Advertisement written by IGT, written by IGT, published in 2000, on or before December thereof.
Top Dollar Brochure written by IGT, published in 1998, on or before December thereof.
Vision Series Good Times Brochure written by IGT, published in 1999, on or before December thereof.
Wheel Poker Article written by Strictly Slots (Anchor Games), published in Nov. 2000.
Winning Streak Web Site Description written by WMS Gaming Inc. (web site), printed on Mar. 21, 2001.
X Factor Brochure and Website p. written by WMS Gaming Inc., published in 1998, on or before December thereof.
Yahtzee Bonus Advertisement, written by Mikohn Winning Solutions Worldwide, published in 1999, on or before Decemeber thereof.
Winning Bid Advertisement written by WMS Gaming Inc., published prior to Jan. 2001.
Triple Bucks Advertisement written by IGT, published in 1999.
Statement of Grounds and Particulars, dated Jul. 8, 2009, Australian Patent application No. 2003216325.

* cited by examiner

GAMING DEVICE HAVING FREE GAME BONUS WITH A CHANGING MULTIPLIER

PRIORITY CLAIM

This application is a continuation of and claims priority to and the benefit of U.S. patent application Ser. No. 10/086,146, filed Feb. 28, 2002, now U.S. Pat. No. 7,258,611, the entire contents of which is incorporated herein.

U.S. patent application Ser. No. 10/650,024 filed on Aug. 27, 2003, now U.S. Pat. No. 7,381,134; U.S. patent application Ser. No. 11/771,740 filed on Jun. 29, 2007, now U.S. Pat. No. 7,789,747; U.S. patent application Ser. No. 11/426,234 filed on Jun. 23, 2006, now U.S. Pat. No. 7,731,584; U.S. patent application Ser. No. 11/465,734 filed on Aug. 18, 2006; U.S. patent application Ser. No. 11/459,872 filed on Jul. 25, 2006, now U.S. Pat. No. 7,481,708; U.S. patent application Ser. No. 11/217,182 filed on Sep. 1, 2005, now U.S. Pat. No. 7,682,246; and U.S. patent application Ser. No. 11/216,323 filed on Aug. 31, 2005, now U.S. Pat. No. 7,666,083.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a free game bonus with a multiplier that changes for each free game.

BACKGROUND OF THE INVENTION

Gaming machine manufacturers constantly strive to make gaming machines that maximize enjoyment and excitement for players. Providing a bonus game in which a player has an opportunity to win potentially large awards or credits in addition to the awards associated with the base game of the gaming machine is one way to enhance player enjoyment and excitement.

Known gaming devices having bonus games employ a triggering event that occurs during play of the base game of the gaming device. The triggering event temporarily stalls or halts the base game play and enables a player to enter a second, different game, which is the bonus game. The player plays the bonus game, likely receives an award, and returns to the base game.

Bonus games that provide players with large awards or the potential to win large awards are especially attractive to players. One way that gaming device manufacturers provide larger or more frequently occurring awards in slot gaming machines is by providing free spins to a player. Several known games provide players a number of free spins at the beginning of the game and spin the reels to obtain awards. This type of bonus game is described in European Patent Application No. EP 0874337A1 and European Patent No. EP 0984409A2. These games are generally versions of a “Spin Until” type bonus game.

EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and to receive several awards. If the player does not obtain a winning symbol combination, the bonus game ends and the player receives the total accumulated awards for the bonus game. Thus, the player spins the reels in the bonus game until they do not obtain a winning combination.

EP 0984409A2 discloses a gaming device wherein the game enables the player to spin a plurality of reels having various symbols attempting to obtain awards. In this bonus game, the player starts the bonus game with a limited number of spins. The player spins the reels until there are no spins remaining. The player receives an award after each spin. The final award in the bonus game is the total of all of the awards accumulated by the player in the game.

Another way that gaming device manufacturers provide larger awards to players is by using multipliers. A multiplier increases the award amount proportionally to the value of the multiplier. For example, a “2×” multiplier pays twice the normal award value. A “3×” multiplier pays three times the normal award value. A multiplier can substantially increase a player’s award. Some games also employ an incrementing multiplier as described in the following paragraphs.

U.S. Pat. No. 6,004,207 discloses a slot machine that provides a multiplied payout when certain symbols or symbol combinations appear on the reels and a player bets the maximum amount of coins. This bonus game includes a plurality of reels including several symbols on the reels and a multiplier. The symbols include multiplier symbols and Power Point symbols. Initially, the bonus game sets the multiplier at a predetermined level. The multiplier increments by one level when the player obtains ten Power Point symbols on the reels from one or more spins. After the multiplier increases in value, the player needs ten more Power Point symbols to increment the multiplier again. The gaming device also enables a player to spin the reels to obtain a winning symbol combination. If the player obtains a winning combination, the gaming device provides the player with an award. If the winning combination includes a multiplier symbol, the award is multiplied by the multiplier. Once an award is multiplied by the multiplier, the multiplier resets to a predetermined level.

Another type of bonus game that includes a multiplied payout is the “GOOD TIMES” gaming device which is manufactured by the assignee of this patent application. This game includes three reels having a plurality of symbols and blank spaces. The symbols include a plurality of “Good Times” symbols. The bonus includes two multiplier groups. A first multiplier group starts at “1×” (or one times the award) and goes up to “12×” (or twelve times the award). The second multiplier group starts at “1×” and goes up to “144×” (or one hundred forty-four times the award). Each time a player spins the reels and obtains three blank spaces on a payline, the designated multiplier in each multiplier increments one level. When the player obtains a winning combination, the player receives an award. If a “Good Times” symbol appears in the winning combination, the player’s award is multiplied by the designated multiplier in the first bonus table. If two “Good Times” symbols appear in the winning combination, the player’s award is multiplied by the designated multiplier in the second bonus group.

It should be appreciated that multipliers may substantially elevate award returns and increase player excitement and enjoyment. Players enjoy playing for high bonus awards. Thus, it is desirable to have a bonus game of a gaming device that provides several opportunities to play a bonus game and has the potential to accumulate large awards.

SUMMARY OF THE INVENTION

The present invention relates in general to a gaming device having a bonus game or scheme, and more particularly to a gaming device having a bonus game or scheme including a plurality of reels, a plurality of symbols on the reels, a plurality of free spins of the reels and a plurality of multipliers associated with the free spins.

In one embodiment, the gaming device provides the player with a plurality of free spins of the reels in the bonus game. A multiplier is associated with each spin of the reels. The multiplier changes and preferably increases after each spin. The processor in the gaming device spins the reels and determines if the player obtains an award based on the combination of symbols on the reels. If the player obtains an award, the award is modified by the multiplier associated with that spin of the reels. In another embodiment, a consolation award is provided to the player if the player does not receive an award after a spin of the reels. In a further embodiment, an accumulated award is provided to the player after there are no spins remaining in the game. The accumulated award may include a plurality of the awards provided to the player or all of the awards provided to the player during the game.

In one embodiment, the multiplier increases by one after each spin. In other embodiments, the multiplier increases by more than one or as desired by the game implementor. In other embodiments, the increase of the multiplier is randomly determined. In one alternative embodiment, the multiplier increases after non-winning games.

In one embodiment, a plurality of reels having several symbols are displayed to a player. The multiplier is also displayed to the player. The player starts the game with a predetermined number of spins in the game. The number of spins may be determined randomly, predefined or picked by playing a sub-game such as by having the player choose from a plurality of masked selections each having an associated number of spins. To start the bonus game, the processor spins or enables the player to initiate a spin of the reels attempting to obtain an award based on a combination of symbols on the reels. If the player obtains an award, the award is modified by the related multiplier. In one embodiment, the multiplier starts at 1× for the first spin and increases with each spin. After each spin, the multiplier is incrementally increased by one. Therefore, each subsequent spin has a larger multiplier. The player continues to spin the reels until there are no spins remaining.

In another embodiment, the gaming device provides the player with additional spins based upon the occurrence of one or more symbols on the reels.

In a further embodiment, the plurality of reels includes a plurality of symbols including at least one, and preferably a plurality of incrementor symbols. The multiplier changes and preferably increases (such as by one) each time the incrementor symbol appears on the display or on a payline associated with the reels. In another alternative embodiment, if one or more incrementor symbols are displayed by the reels, the multiplier increases by the number of incrementor symbols that are displayed on the reels.

In one embodiment, the multiplier of the present invention is employed in a poker game. In another embodiment, the multiplier of the present invention is employed in a keno game.

In one alternative embodiment, the multiplier is predetermined by the processor at the beginning of the bonus game. Then, the multiplier may increase by a predetermined amount or a random amount after each game.

In another alternative embodiment, the multiplier is randomly determined at the beginning of the bonus game and then randomly determined after each subsequent game. The processor or player may select the new multiplier. In one embodiment, the gaming device displays a plurality of player selectable selections to the player. The selections are masked or hidden from the player and when selected, display a multiplier to the player. The multipliers are randomly associated with the selections. The player may pick one or a plurality of selections. In another embodiment, the selections are only displayed to the player after a specific symbol combination occurs on the reels.

In one alternative embodiment, a light display is mounted to the gaming device and displays the multiplier to the player after the processor randomly selects the multiplier.

In another alternative embodiment, different increases of the multiplier and different probabilities are associated with different incrementor symbols such that one incrementor symbol has a greater probability of appearing on the reels than another incrementor symbol.

In an alternative embodiment, there is a weighted probability of increasing the multiplier by more than one.

It is therefore an advantage of the present invention to provide a gaming device having a free game bonus with a multiplier that increments after each game.

Another advantage of the present invention to provide a gaming device including a multiplier that increments after each game to provide larger awards to players.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
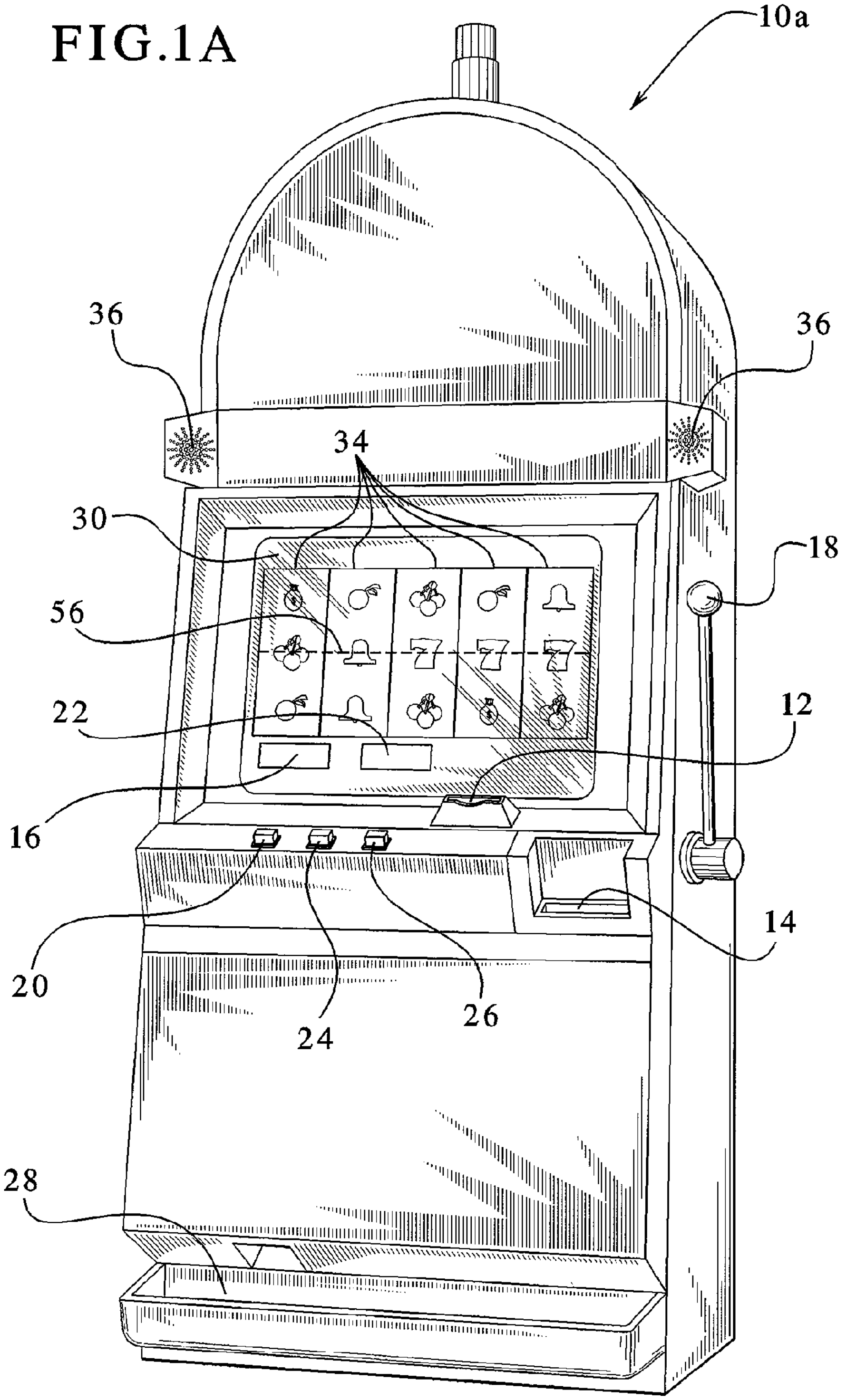
FIG. 1A is a front perspective view of one embodiment of the gaming device of the present invention.
Figure 1B:
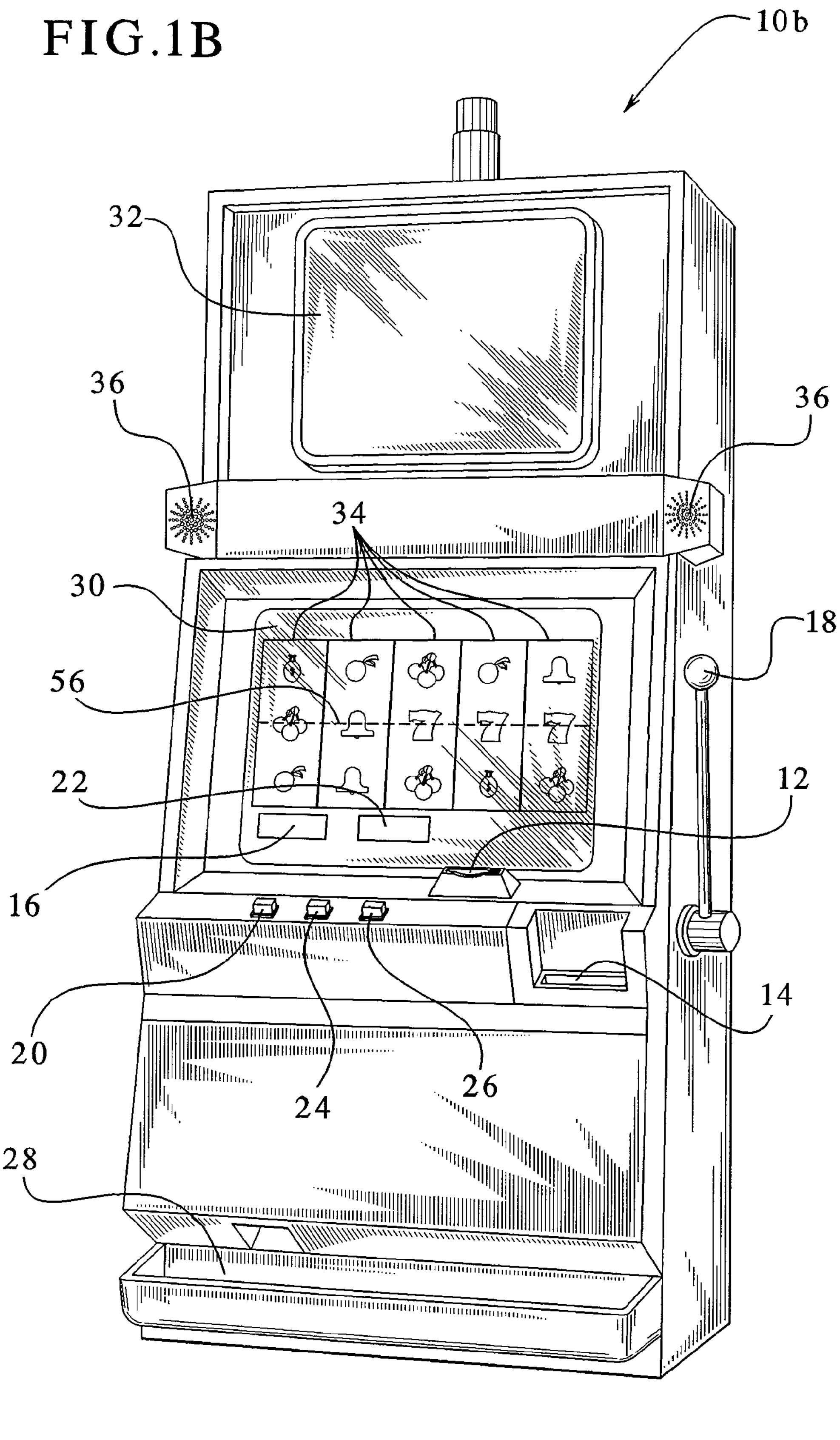
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is, in one embodiment, a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, any of their bonus triggering events and any of the bonus round games. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34, such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
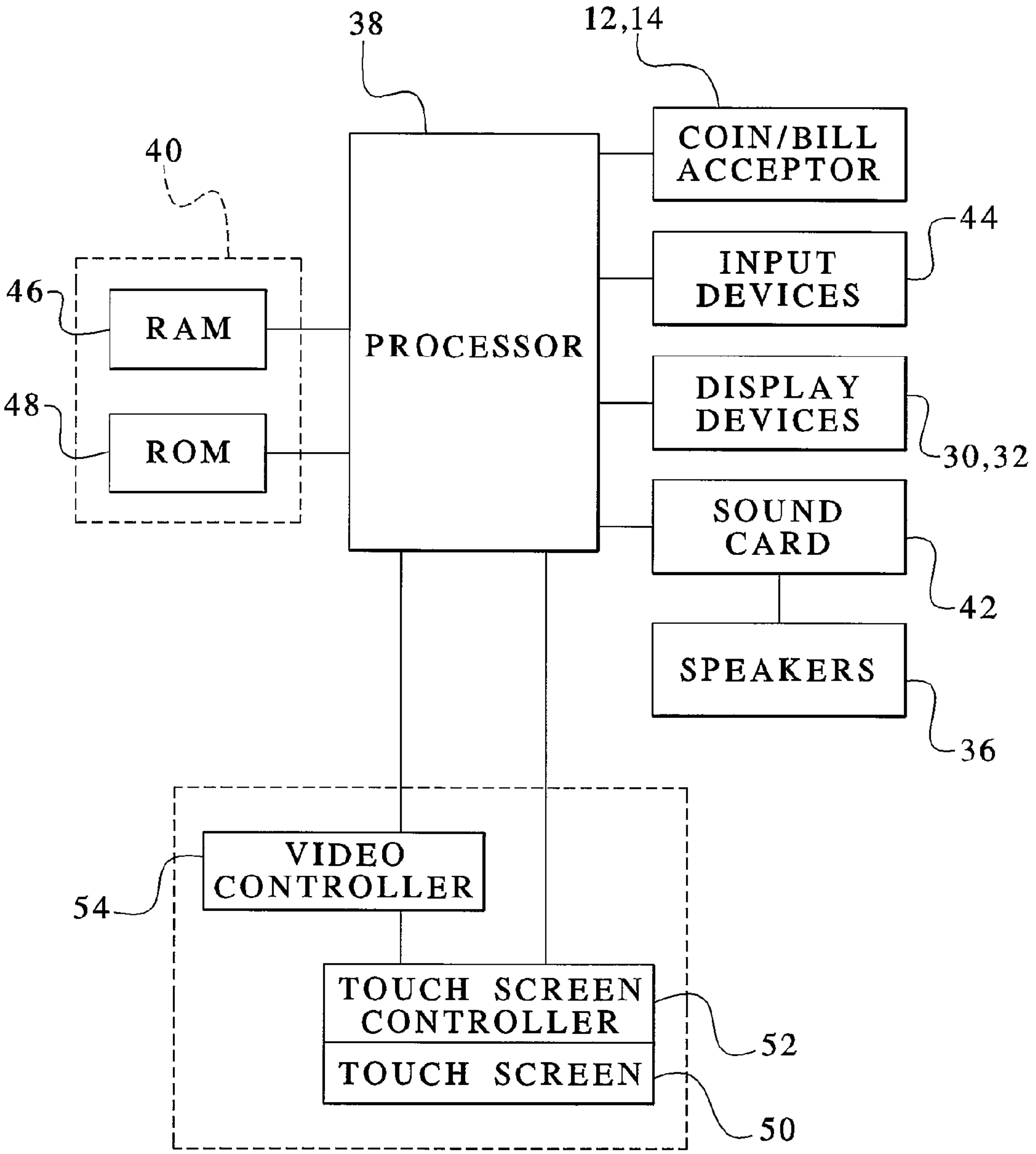
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively, and/or individually, referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels

34 along a payline 56. It should be appreciated that the present invention can include one or more paylines, such as payline 56, wherein the paylines can be horizontal, diagonal or any combination thereof.

Free Game Bonus

Figure 3:
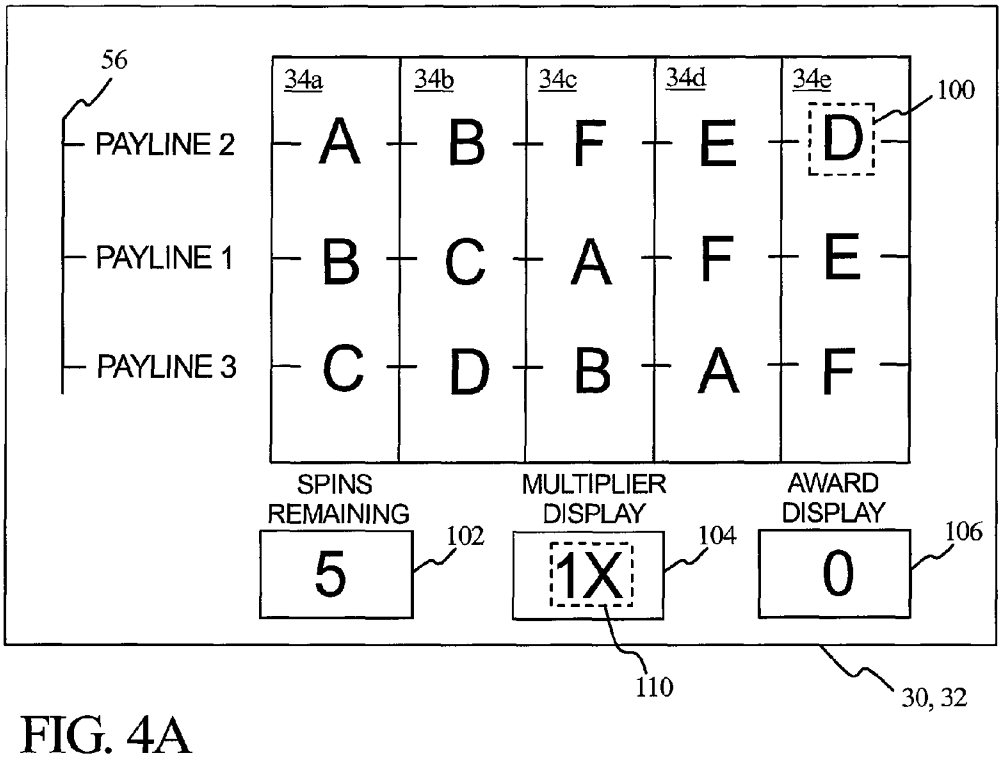
FIG. 3 is an enlarged front elevation view of a display illustrating one embodiment of the present invention.

Referring now to FIG. 3, one embodiment of the present invention includes a plurality of reels 34*a* to 34*e* and one or more associated paylines 56 displayed by a video monitor 30 or 32 (FIG. 1A or 1B). Each reel 34 has a plurality of symbols A through F generally designated by numeral 100. It should be appreciated that the symbols may be any suitable symbol. A spin remaining display 102 initially indicates the number of free spins provided to the player by the processor to start the bonus game. The number of free spins or activations could be predetermined, randomly determined, or based on various factors such as the player's wager in the base game. Thereafter, the spins remaining display 102 indicates the number of free spins remaining in the bonus game. It should be appreciated that the player may be provided with additional free spins during a game, where the free spins are based on the occurrence of one or more symbols on the reels.

The multiplier display 104 displays the multiplier associated with a particular free spin or activation of the reels. In one embodiment, the multiplier associated with each free spin increases by a predetermined amount. In another embodiment, the amount of the increase is an amount selected from a range greater than zero and less than ten after each free spin of the reels. In a further embodiment, the multiplier associated with each free spin increases by a random amount.

The award display 106 displays the total award, or the value of the accumulated awards, during the bonus game. The award value indicated by award display 106 at the end of a game is the award that the player receives for that bonus game.

Referring now to FIGS. 4A through 4E, an example of this embodiment of the present invention is illustrated where the gaming device provides a player with five free spins and a "1×" multiplier to begin the bonus game. In this embodiment, the game starts with a "1×" multiplier. However, it should be appreciated that the game could start with any multiplier desired by the game implementor. It should also be appreciated that the starting multiplier could be randomly determined or based on another factor such as the player's wager in the primary game. It should be appreciated that any pay table or award table may be used in the bonus game. The pay table for this example is as follows: three of the same symbols along payline one awards twenty-five, four of the same symbols along payline one awards fifty, and five of the same symbols along payline one awards one hundred to a player. The bonus game is not limited to payline one and it should be appreciated that another payline or combination of paylines 56 may be used to trigger the bonus award.

In one embodiment, a consolation award is provided to the player if the player does not receive an award after a free spin. In one aspect of this embodiment, the consolation award is predetermined by the processor. In another aspect, the consolation award is randomly determined by the processor. In a further aspect of the present invention, the consolation award is based on the multiplier associated with each free spin of the reels.

In another embodiment, an accumulated award is provided to the player after there are no spins remaining in the game. The accumulated award is based on the awards, if any, provided to the player after each spin. The accumulated award may include a plurality of the awards provided to the player or all of the awards provided to the player.

Figure 4A:
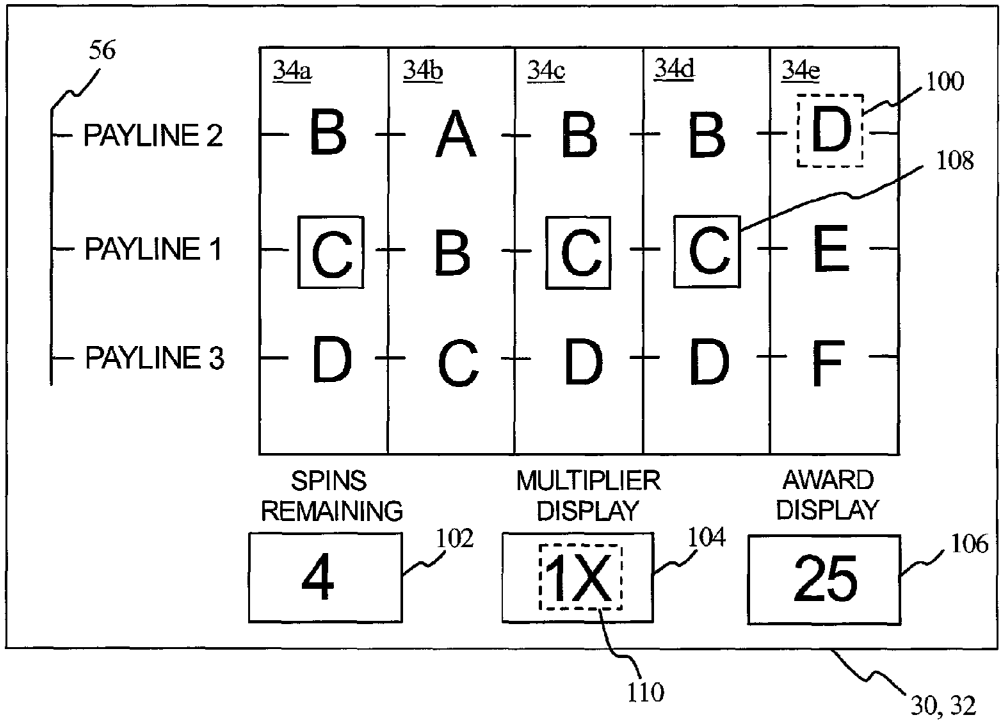
FIGS. 4A to 4E are enlarged front elevation views of a display illustrating an example game of one embodiment of the present invention.

The player starts the secondary or bonus game by spinning the reels. FIG. 4A illustrates the first spin by the player in the bonus game. In the first spin, the player obtained three "C" symbols 108 along payline one. According to the pay table described above, the player receives an award of twenty-five. Because the multiplier 110 is "1×" or multiplies the award value by one, the player's award for that spin remains twenty-five. The award value, twenty-five, is transferred to the award display 106 as illustrated in FIG. 4A. The player now has four spins remaining as shown in spin display 102 as illustrated in FIG. 4A. The processor increments the multiplier by one prior to the next free spin. The multiplier is "2×" for the next free spin.

Figure 4B:
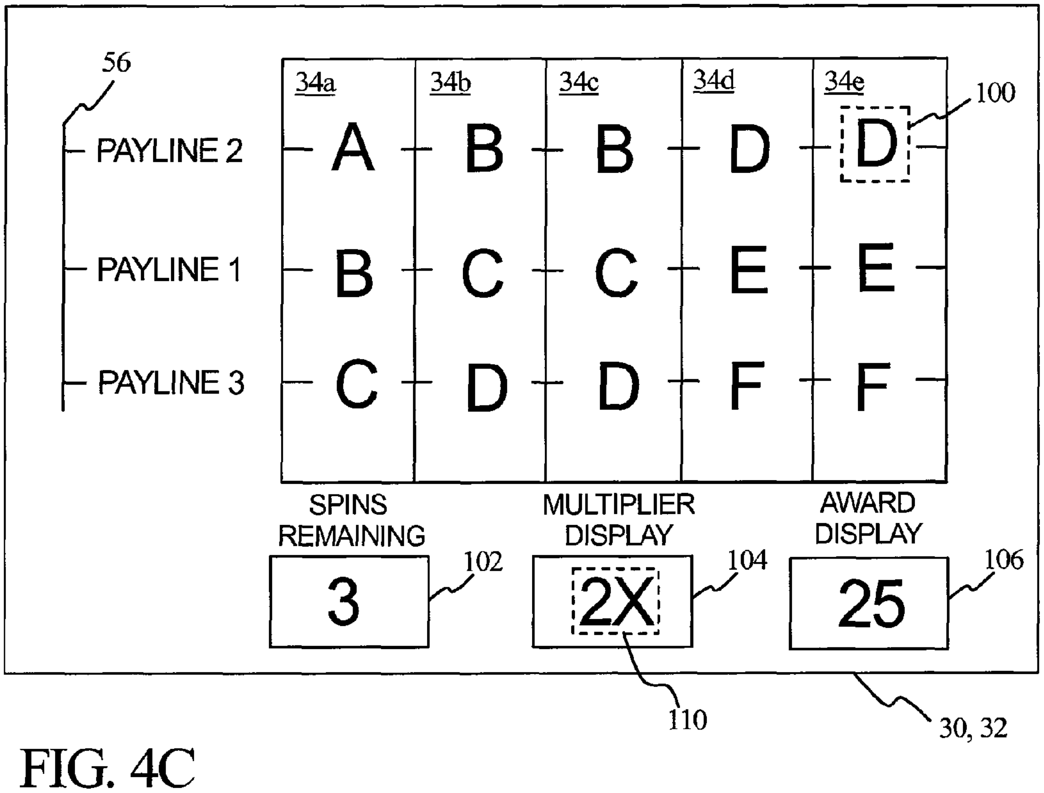

Referring now to FIG. 4B, the player uses their second free spin to spin the reels 34 in the bonus game. After spinning the reels, the player only obtained two "C" symbols and two "E" symbols on payline one. Because this combination of symbols is not an award combination, the player does not receive an award for this spin. Because the player did not obtain an award after the second spin, the player's award total does not change as indicated by the award display 106. The player now has only three spins remaining in the bonus game as indicated by spin remaining display 102. The processor increments the multiplier prior to the next free spin. The multiplier is now "3×."

Figure 4C:
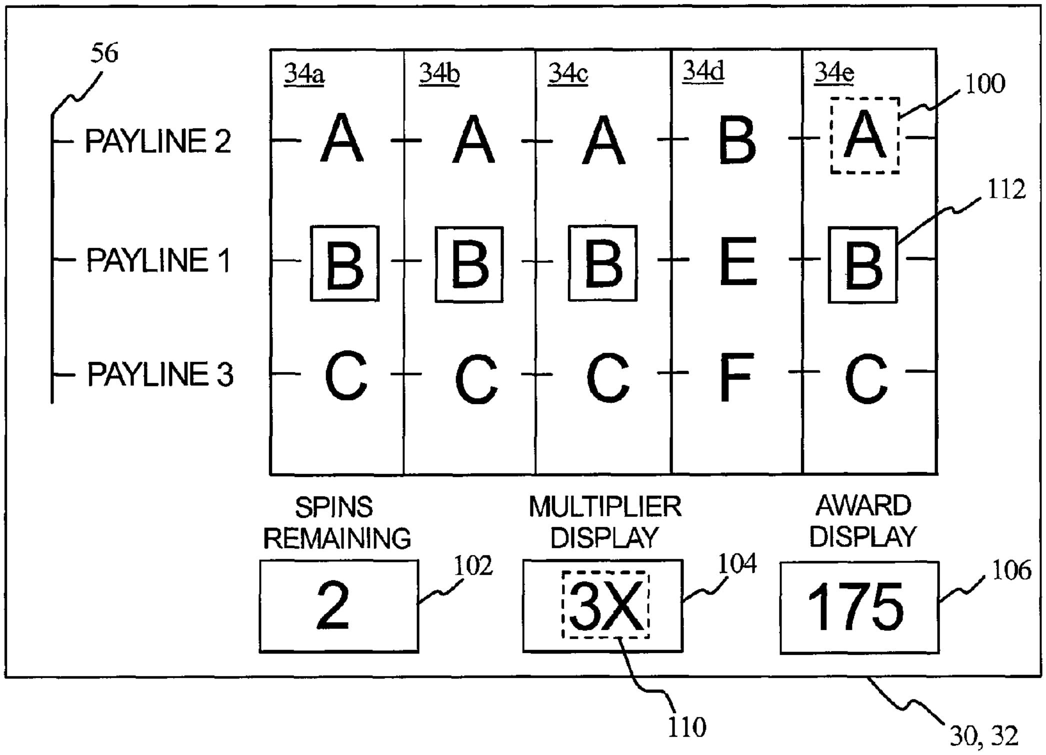

Referring to FIG. 4C, the multiplier 110 for this spin is "3×," or three times an award value, as indicated by multiplier display 104. It should be appreciated that in this embodiment, the multiplier continues to increment by one after each spin, regardless of whether the player obtains an award or not. The multiplier may alternatively change as discussed below. The player spins the reels 34 again and obtains four "B" symbols 112 along payline one. The four "B" symbols provide an award of fifty to the player. In addition, the award value, fifty, is multiplied by three because the multiplier for this spin is "3×." Thus, the player receives a total award of one hundred fifty for the third spin in the bonus game. Furthermore, the award brings the player's total award to one hundred seventy-five as shown in award display 106. This spin shows how a player may accumulate much larger awards based on the incrementing multiplier even though some spins do not result in awards. The player has two free spins remaining as indicated by spin remaining display 102. The gaming device increments the multiplier to "4×" prior to the next free spin.

Figure 4D:
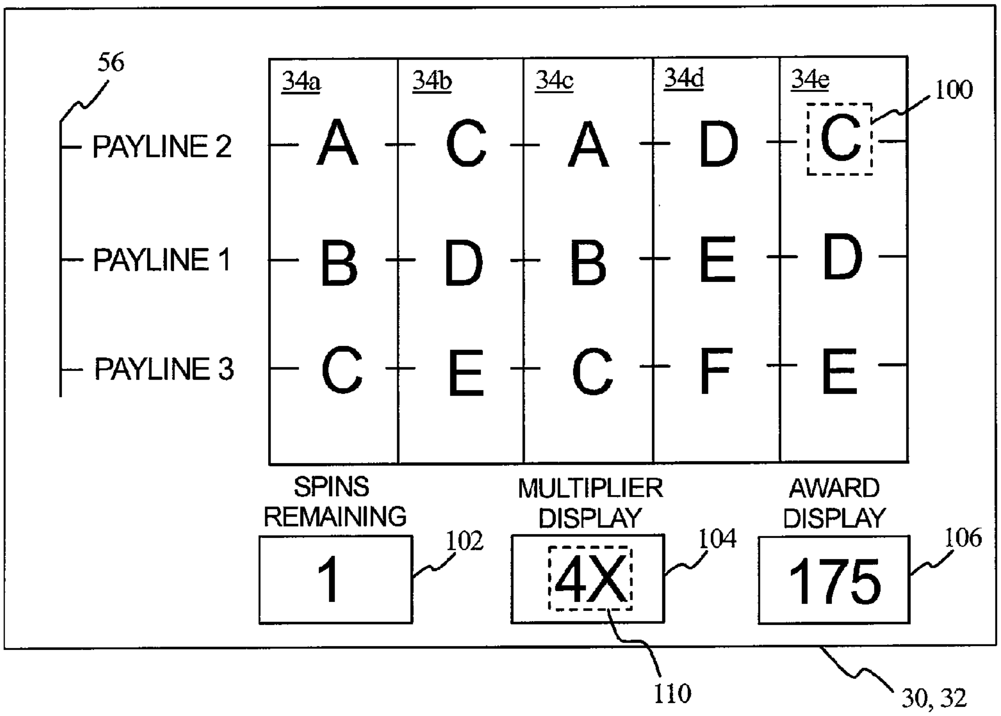

Referring now to FIG. 4D, the potential award for this spin increases substantially because the multiplier 110 continues to increment after each spin. The multiplier is "4×" which will multiply any award that the player receives for this spin by four. The player spins the reels 34, however, the player fails to obtain any award after this spin. The total award, one hundred seventy-five, remains unchanged as shown in award display 106 and the player has only one spin remaining in the bonus game. The gaming device increments the multiplier 110 to "5×" before the next free spin.

Figure 4E:
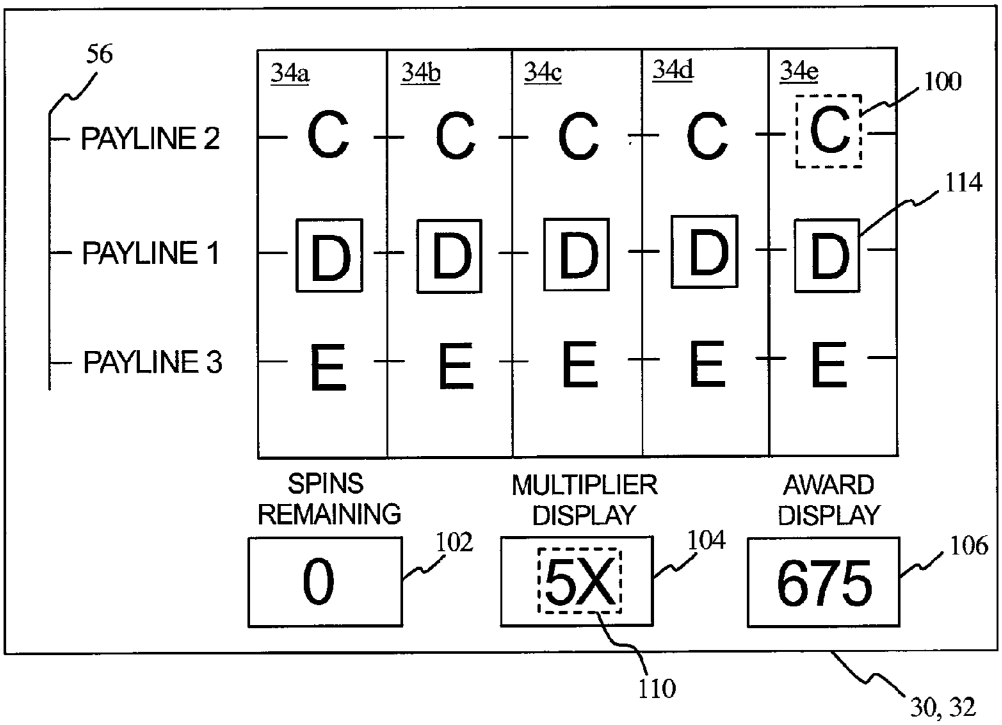

Referring to FIG. 4E, the player spins the reels for the final time in the bonus game. On their final free spin in the bonus game, the player obtained five "D" symbols 114 along payline one. In this particular game, five identical symbols across payline one pays an award of one hundred. Also, the multiplier is "5×" for this spin. Therefore, the award for this spin, one hundred, is multiplied by five to achieve a total award of five hundred for this spin. The award is added to the total award in award display 106 to give the player a final award total of six hundred seventy-five for the bonus game. The player does not have any free spins remaining in the bonus game as indicated by spin remaining display 102. Thus, the bonus game ends. The final spin in this bonus game illustrates how one spin can result in a very large award.

The above example illustrated in FIGS. 4A to 4E, shows how the incremental effect of the multiplier 110 increases the level of player excitement and enjoyment in the bonus game. Potentially, a player might not obtain an award combination on any spin in the bonus game except for the last spin. Since the last spin has a larger multiplier than the previous spins, the player still will receive a large award. Therefore, the player's excitement builds as they progress further into the bonus game of the present invention because the potential for larger awards also builds based on the increasing multiplier.

In one embodiment of the present invention, the multiplier increments after each game, regardless of whether the player obtained a winning combination or not. Because the multiplier continues to increment even after non-winning combinations, the player still may obtain large awards in the bonus game, which increases the player's excitement and enjoyment of the game. For example, a bonus game begins with a multiplier of "1×" and increments by "1×" after each free spin. If a player does not obtain an award combination until the player's fourth free spin, the player still receives a large award because the multiplier in the fourth free spin is "4×."

In another embodiment of the present invention, the multiplier 110 increases by a predetermined amount that is greater than one after each free spin in the bonus game. For example, the multiplier begins a bonus game at "1×" and increases by "2×" after each free spin of the reels. After the first spin the multiplier increases to "3×," after the second spin the multiplier increases to "5×" and so forth. It should be appreciated that the multiplier can also increase by a predetermined multiplication factor. For example, the multiplier can increase by two or double after each free spin. The multiplier starts the bonus game at "1×" then increases to "2×" after the first free spin, "4×" after the second free spin and so forth. In a further embodiment, the multiplier increases by a random amount after each free spin. The random amount is determined by the processor. In yet another embodiment, the multiplier increases by a predetermined amount after a predetermined number of free spins greater than one. In still a further embodiment of the present invention, the multiplier increases by a random amount after a random number of free spins as determined by the processor.

Figure 5A:
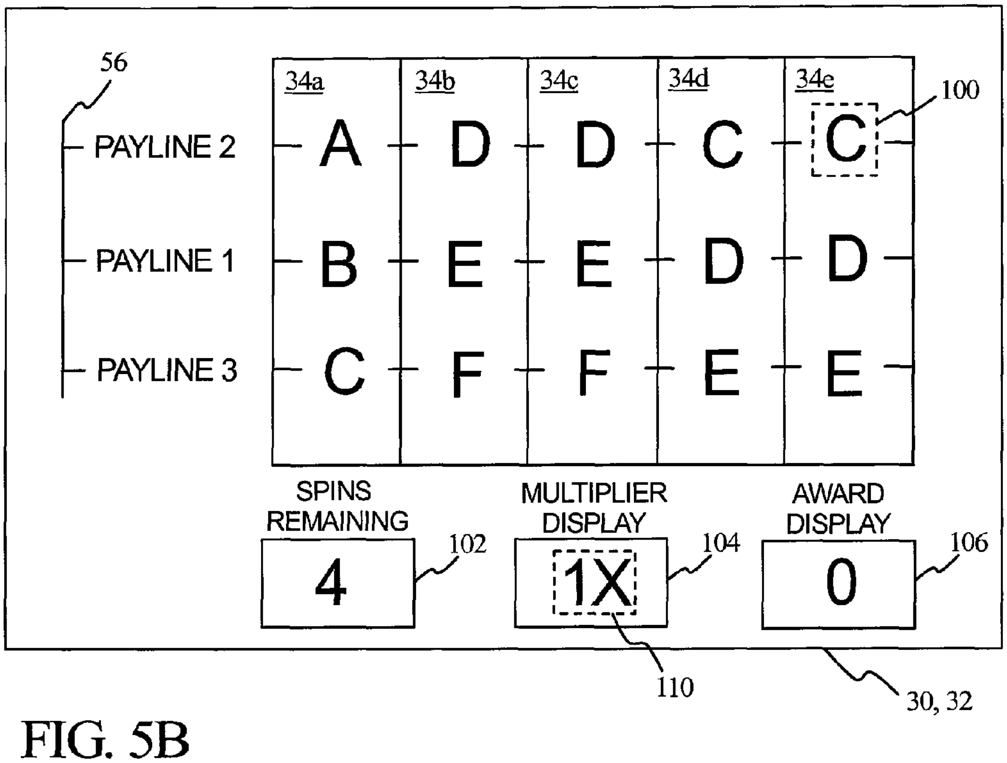
FIGS. 5A to 5D are enlarged front elevation views of another embodiment of the present invention illustrating having one or more incrementor symbols.
Figure 5B:
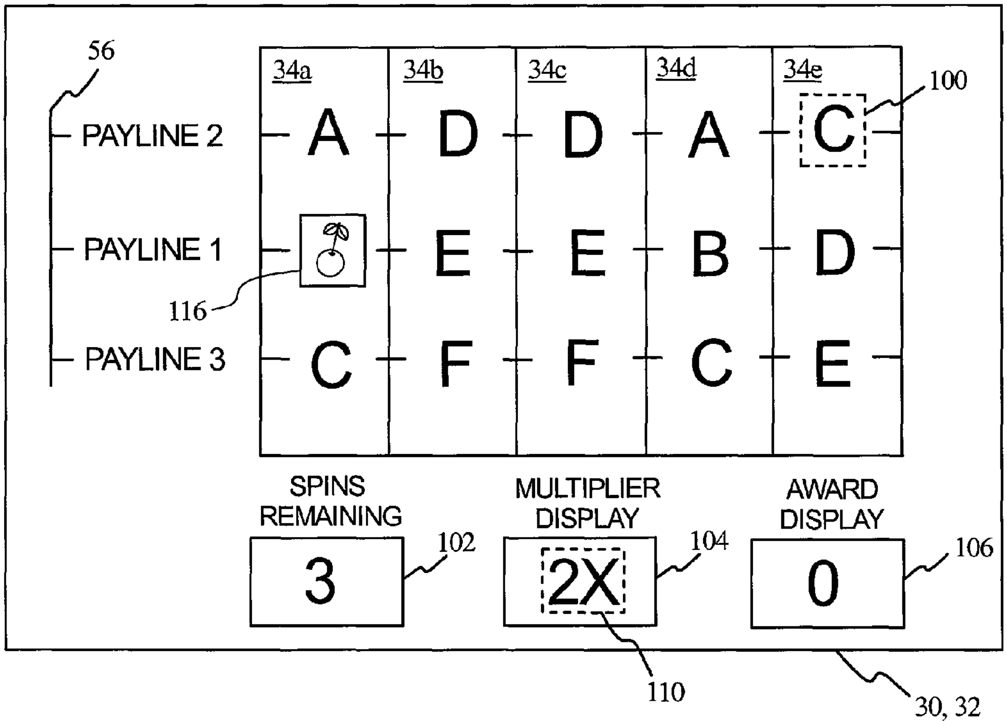
Figure 5C:
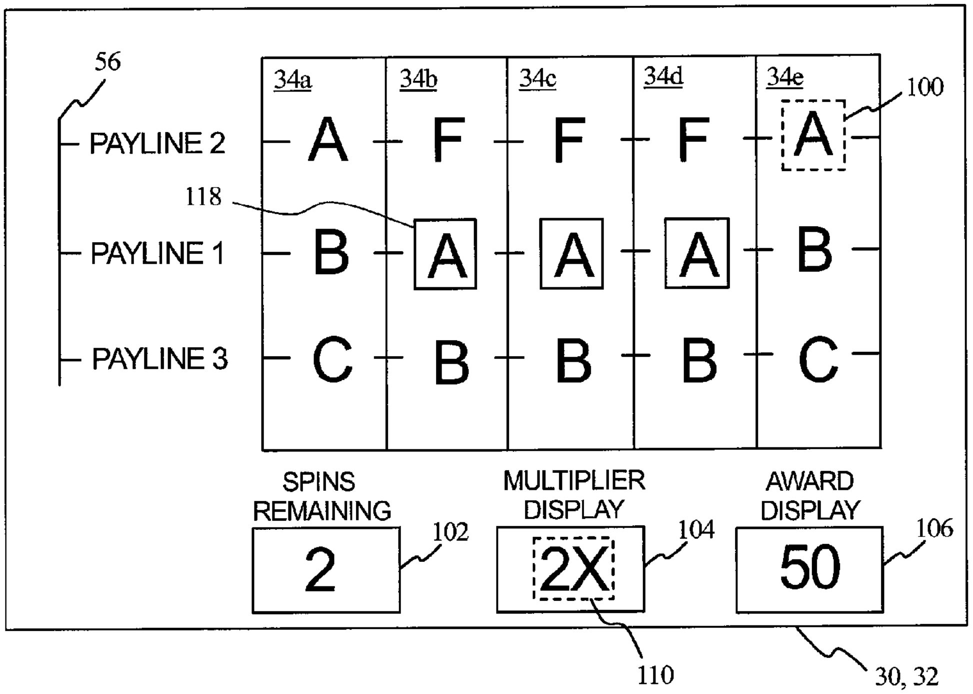

Referring now to FIGS. 5A, 5B, and 5C, another embodiment of the present invention is illustrated where the multiplier 110 additionally or alternatively increments when a particular symbol 100 or a symbol combination appears on the reels or any payline 56 associated with the reels. It should be appreciated that the symbol could appear on a specific payline or in any other manner desired by the game implementor. In this embodiment, the reels include symbols A through F, plus incrementing symbols 116 designated by a cherry symbol in this example. It should be appreciated that the incrementor may be any suitable symbol desired by the game implementor. A player spins the reels 34 attempting to obtain an award plus one or more incrementor symbols 116. The game may display player one incrementor at a time and accordingly increase the multiplier 110 by only one after a spin. However, it is contemplated that a player may receive more than one incrementor in a spin. In one embodiment, the incrementors are associated with probabilities such that one incrementor symbol has a greater probability of appearing on the reels than two or more incrementor symbols. In one embodiment, the multiplier 110 increments only when an incrementor symbol appears on a payline. In one alternative embodiment, there is a weighted probability of increasing the incrementor by more than one when an incrementor symbol is displayed.

In FIG. 5A, the bonus game begins with four spins as indicated by spins remaining display 102, a multiplier of "1×" as indicated by multiplier display 110, and a total award of zero as indicated by the award display 106. In FIG. 5B, the gaming device or player spins the reels 34 and obtains an incrementor symbol 116, designated by a cherry symbol in this example, on payline one. The player does not obtain a winning symbol combination in this spin. Therefore, the total award remains at zero as indicated by the award display 106 and the multiplier 110 increments by one from "1×" to "2×" as indicated by multiplier display 104. The multiplier remains "2×" until the player obtains another incrementor symbol on a payline.

Referring to FIG. 5C, the gaming device or player spins the reels 34 and does not obtain an incrementor symbol, or cherry symbol, on payline one. Therefore, the multiplier 110 remains unchanged as indicated by the multiplier display 104. However, the player does obtain a winning symbol combination in this spin. The winning symbol combination is three "A" symbols 118 on payline one and provides an award of twenty-five. Therefore, the award, twenty-five, is multiplied by the multiplier "2×" to obtain the total award of fifty as indicated by the award display 106. In this embodiment, only the award provided from a particular spin is multiplied by the multiplier for that spin.

Figure 5D:
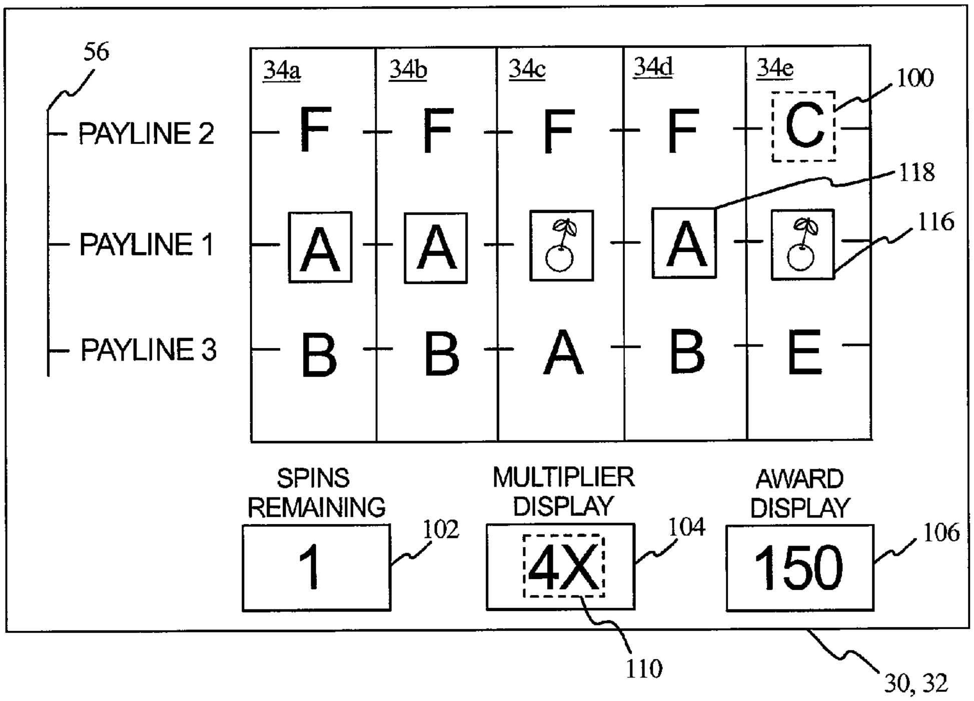

In FIG. 5D, the gaming device or player spins the reels. The player obtains three "A" symbols 118 along payline one. Also, the player obtained two incrementor symbols 116 on a payline in that spin. Thus, the multiplier 110 increments two times (for each incrementor symbol) or from "2×" to "4×." The player's award in the bonus game, twenty-five, is multiplied by four to achieve a total award for this spin of one hundred. The player's new total award in the bonus game becomes one hundred fifty, as indicated by award display 106. The player will continue to spin the reels 34 until there are no spins remaining in the bonus game.

It should be appreciated that the present invention could be employed in other games such as poker, blackjack, keno and other primary or secondary games.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

display a wagered on play of a first game, determine if a triggering event occurs, and for each and every determination that the triggering event occurs:

(a) display a designated number of free plays of a second game, said designated number being at least two, and (b) for each free play of the second game, determine and display any awards for said free play of the second game based upon: (1) a plurality of symbols occurring in said free play of the second game, and (2) one of a plurality of multipliers, wherein:

(i) any award for a first one of the free plays of the second game is based on a first one of the multipliers having a first value greater than zero, and (ii) any award for a second, different one of the free plays of the second game is based on a second, different multiplier having a value which is determined based on a value of said first multiplier and a randomly determined increment value greater than zero, said value of said second multiplier being determined independently of said symbols occurring in said free plays of the second game, and regardless of whether an award was paid to the player in a previous free play of the second game.

2. The gaming system of claim 1, wherein the designated number of free plays of the second game is predetermined.

3. The gaming system of claim 1, wherein the triggering event occurs during the wagered on play of the first game.

4. The gaming system of claim 1, wherein the first game and the second game are a same game.

5. The gaming system of claim 1, wherein said at least one display device and said at least one input device reside in a housing.

6. The gaming system of claim 5, wherein the at least one processor resides remote from the housing.

7. The gaming system of claim 6, wherein said at least one processor determines said multipliers.

8. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

display a wagered on play of a first game, determine if a triggering event occurs, and for each and every determination that the triggering event occurs:

(a) display a second game including a designated number of free plays, said designated number being at least two, (b) associate a multiplier with a first one of the number of free plays, said multiplier having a value greater than zero, (b) for each sequential free play of the second game, increment the value of said multiplier by a randomly determined amount greater than zero and associate said incremented multiplier with said subsequent free play, and (c) for each free play of the second game, determine and display any award based on a plurality of symbols occurring in said free play of the second game and the multiplier associated with said free play of the second game.

9. The gaming system of claim 8, wherein the designated number of free plays of the second game is predetermined.

10. The gaming system of claim 8, wherein the triggering event occurs during said wagered on play of the first game.

11. The gaming system of claim 8, wherein the first game and the second game are a same game.

12. The gaming system of claim 8, wherein said at least one display device and said at least one input device reside in a housing.

13. The gaming system of claim 12, wherein the at least one processor resides remote from the housing.

14. The gaming system of claim 13, wherein said at least one processor associates said plurality of multipliers with said free plays of the second game.

15. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

display a wagered on play of a first game, determine if a triggering event occurs, and for each and every determination that the triggering event occurs:

(a) display a designated number of free plays of a second game, said designated number being at least two, (b) increase the multiplier associated with each subsequent free play of the second game by a randomly determined amount each time a designated number of incrementor symbols occur in the free play of the second game, said designated number being at least one, and (c) for each free play of the second game, determine and display any awards based on a plurality of symbols occurring in said free play of the second game and the multiplier associated with said free play of the second game.

16. The gaming system of claim 15, wherein the designated number of free plays of the second game is predetermined.

17. The gaming system of claim 15, wherein the triggering event occurs during said wagered on play of the first game.

18. The gaming system of claim 15, wherein each incrementor symbol causes the multiplier to increase by a randomly determined amount.

19. The gaming system of claim 15, wherein the first game and the second game are a same game.

20. The gaming system of claim 15, wherein said at least one display device and said at least one input device reside in a housing.

21. The gaming system of claim 20, wherein the at least one processor resides remote from the housing.

22. The gaming system of claim 21, wherein said at least one processor associates said multipliers with said free plays of the second game.

23. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

display a wagered on play of a first game, determine if a triggering event occurs, and for each and every determination that the triggering event occurs:

(a) display a designated number of free plays of a second game, wherein a plurality of multipliers are associated with the free plays of the second game and said designated number is at least two, (b) increase the multiplier associated with each subsequent free play of the second game by a first amount each time a first incrementor symbol occurs in the free play of the second game, (c) increase the multiplier associated with each subsequent free play of the second game by a second amount each time a second incrementor symbol occurs in the free play of the second game, said second amount being different than the first amount and said second incrementor symbol being different than said first incrementor symbol, and (d) for each free play of the second game, determine and display any awards based upon a plurality of symbols occurring in said free play of the second game and the multiplier associated with said free play of the second game.

24. The gaming system of claim 23, wherein the designated number of free plays of the second game is predetermined.

25. The gaming system of claim 23, wherein the triggering event occurs during said wagered on play of the first game.

26. The gaming system of claim 23, wherein the first amount is a predetermined amount.

27. The gaming system of claim 23, wherein the first amount is a randomly determined amount.

28. The gaming system of claim 23, wherein the second amount is a predetermined amount.

29. The gaming system of claim 23, wherein the second amount is a randomly determined amount.

30. The gaming system of claim 23, wherein each time the first incrementor symbol occurs in the free play of the second game, the multiplier associated with said current free play of the second game increases by the first amount.

31. The gaming system of claim 23, wherein each time the second incrementor symbol occurs in the free play of the second game, the multiplier associated with said current free play of the second game increases by the second amount.

32. The gaming system of claim 23, wherein the first game and the second game are a same game.

33. The gaming system of claim 23, wherein said at least one display device and said at least one input device reside in a housing.

34. The gaming system of claim 33, wherein the at least one processor resides remote from the housing.

35. The gaming system of claim 34, wherein for each free play of the second game, said at least one processor associates the multiplier with said free play of the second game.

36. A method of operating a gaming system including a plurality of instructions stored on a memory device, said method comprising:

causing a display device to display a wagered on play of a first game, causing a processor to execute the plurality of instructions to determine if a triggering event occurs, and for each and every determination that the triggering event occurs:

(a) causing the display device to display a designated number of free plays of a second game, said designated number being at least two, (b) for each free play of the second game, causing the processor to execute the plurality of instructions to operate to determine any awards for said free play of the second game based upon: (1) a plurality of symbols occurring in said free play of the second game, and (2) one of a plurality of multipliers, wherein:

(i) any award for a first one of the free plays of the second game is based on a first one of the multipliers having a first value greater than zero, and (ii) any award for a second, different one of the free plays of the second game is based on a second, different multiplier having a value which is determined based on said value of said first multiplier and a randomly determined increment value greater than zero, said value of said second multiplier being determined independently of said symbols occurring in said free plays of the second game, and regardless of whether an award was paid to the player in a previous free play of the second game, and (c) causing the display device to display said determined any awards.

37. The method of claim 36, wherein the designated number of free plays of the second game is predetermined.

38. The method of claim 36, wherein the triggering event occurs during the wagered on play of the first game.

39. The method of claim 36, wherein the first game and the second game are a same game.

40. The method of claim 36, wherein at least one free play of the second game includes the plurality of symbols occurring on a plurality of reels.

41. The method of claim 36, which is provided through a data network.

42. The method of claim 41, wherein the data network is an internet.

43. A method of operating a gaming system including a plurality of instructions stored on a memory device, said method comprising:

causing a display device to display a wagered on play of a first game, causing a processor to execute the plurality of instructions to determine if a triggering event occurs, and for each and every determination that the triggering event occurs:

(a) causing the display device to display a second game including a designated number of free plays, said designated number being at least two, (b) associate a multiplier with a first one of the number of free plays, said multiplier having a value greater than zero, (c) causing the processor to execute the plurality of instructions to, for each sequential free play of the second game, increment the value of said multiplier by a randomly determined amount greater than zero and associate said incremented multiplier with said subsequent free play, (d) for each free play of the second game, causing the processor to execute the plurality of instructions to determine any awards based on a plurality of symbols occurring in said free play of the second game and the multiplier associated with said free play of the second game, and (e) causing the display device to display said determined any awards.

44. The method of claim 43, wherein the designated number of free plays of the second game is predetermined.

45. The method of claim 43, wherein the triggering event occurs during said wagered on play of the first game.

46. The method of claim 43, wherein the first game and the second game are a same game.

47. The method of claim 43, wherein at least one free play of the second game includes the plurality of symbols occurring on a plurality of reels.

48. The method of claim 43, which is provided through a data network.

49. The method of claim 41, wherein the data network is an internet.

50. A method of operating a gaming system including a plurality of instructions stored on a memory device, said method comprising:

causing a display device to display a wagered on play of a first game, causing a processor to execute the plurality of instructions to determine if a triggering event occurs, and for each and every determination that the triggering event occurs:

(a) causing the display device to display a designated number of free plays of a second game, said designated number being at least two, (b) causing the processor to execute the plurality of instructions to increase the multiplier associated with each subsequent free play of the second game by a randomly determined amount each time a designated number of incrementor symbols occur in the free play of the second game, said designated number being at least one, (c) for each free play of the second game, causing the processor to execute the plurality of instructions to determine any awards based on a plurality of symbols occurring in said free play of the second game and the multiplier associated with said free play of the second game, and (d) causing the display device to display said determined any awards.

51. The method of claim 50, wherein the designated number of free plays of the second game is predetermined.

52. The method of claim 50, wherein the triggering event occurs during said wagered on play of the first game.

53. The method of claim 50, wherein each incrementor symbol causes the multiplier to increase by a randomly determined amount.

54. The method of claim 50, wherein the first game and the second game are a same game.

55. The method of claim 50, wherein at least one free play of the second game includes the plurality of symbols occurring on a plurality of reels.

56. The method of claim 50, which is provided through a data network.

57. The method of claim 56, wherein the data network is an internet.

58. A method of operating a gaming system including a plurality of instructions stored on a memory device, said method comprising:

causing a display device to display a wagered on play of a first game, causing a processor to execute the plurality of instructions to determine if a triggering event occurs, and for each and every determination that the triggering event occurs:

(a) causing the display device to display a designated number of free plays of a second game, wherein a plurality of multipliers are associated with the free plays of the second game and said designated number is at least two, (b) causing the processor to execute the plurality of instructions to increase the multiplier associated with each subsequent free play of the second game by a first amount each time a first incrementor symbol occurs in the free play of the second game, (c) causing the processor to execute the plurality of instructions to increase the multiplier associated with each subsequent free play of the second game by a second amount each time a second incrementor symbol occurs in the free play of the second game, said second amount being different than the first amount and said second incrementor symbol being different than said first incrementor symbol, (d) for each free play of the second game, causing the processor to execute the plurality of instructions to determine any awards based upon a plurality of symbols occurring in said free play of the second game and the multiplier associated with said free play of the second game, and (e) causing the display device to display said determined any awards.

59. The method of claim 58, wherein the designated number of free plays of the second game is predetermined.

60. The method of claim 58, wherein the triggering event occurs during said wagered on play of the first game.

61. The method of claim 58, wherein the first amount is a predetermined amount.

62. The method of claim 58, wherein the first amount is a randomly determined amount.

63. The method of claim 58, wherein the second amount is a predetermined amount.

64. The method of claim 58, wherein the second amount is a randomly determined amount.

65. The method of claim 58, which includes causing the processor to execute the plurality of instructions to increase the multiplier associated with said current free play of the second game by the first amount each time the first incrementor symbol occurs in the free play of the second game.

66. The method of claim 58, which includes causing the processor to execute the plurality of instructions to increase the multiplier associated with said current free play of the second game by the second amount each time the second incrementor symbol occurs in the free play of the second game.

67. The method of claim 58, wherein the first game and the second game are a same game.

68. The method of claim 58, wherein at least one free play of the second game includes the plurality of symbols occurring on a plurality of reels.

69. The method of claim 58, which is provided through a data network.

70. The method of claim 69, wherein the data network is an internet.

* * * * *

UNITED STATES PATENT AND TRADEMARK OFFICE

CERTIFICATE OF CORRECTION

PATENT NO. : 8,029,358 B2
APPLICATION NO. : 11/840048
DATED : October 4, 2011
INVENTOR(S) : Robert F. Bigelow, Jr. et al.

It is certified that error appears in the above-identified patent and that said Letters Patent is hereby corrected as shown below:

IN THE CLAIMS:

In Claim 8, column 11, line 54, replace “(b)” with --(c)--.

In Claim 8, column 11, line 59, replace “(c)” with --(d)--.

In Claim 14, column 12, lines 9 to 10, replace “plurality of multipliers” with --multiplier-- and “free plays of the second game” with --first one of the number of free plays--.

In Claim 15, column 12, line 27, replace “the multiplier” with --a multiplier--.

In Claim 30, column 13, line 35, between “the” and “free” add --current--.

In Claim 31, column 13, line 39, between “the” and “free” add --current--.

In Claim 50, column 15, line 22, replace “the multiplier” with --a multiplier--.

In Claim 58, column 16, line 26, delete “any.”

In Claim 65, column 16, line 43, between “the” and “free” add --current--.

In Claim 66, column 16, line 48, between “the” and “free” add --current--.

Signed and Sealed this
Thirteenth Day of December, 2011

David J. Kappos

David J. Kappos
*Director of the United States Patent and Trademark Office*